I. C. HICKS & G. L. SUMMERS.
HOBBY HORSE.
APPLICATION FILED FEB. 14, 1917.

1,241,975.

Patented Oct. 2, 1917.
2 SHEETS—SHEET 1.

Witnesses
Frederick W. Ely

Inventor
I. C. Hicks.
G. L. Summers.
By Victor J. Evans
Attorney

UNITED STATES PATENT OFFICE.

IRA CLAY HICKS AND GEORGE L. SUMMERS, OF HUNTINGTON, WEST VIRGINIA.

HOBBY-HORSE.

1,241,975.      Specification of Letters Patent.      Patented Oct. 2, 1917.

Application filed February 14, 1917. Serial No. 148,549.

*To all whom it may concern:*

Be it known that we, IRA C. HICKS and GEORGE L. SUMMERS, citizens of the United States, residing at Huntington, in the county of Cabell and State of West Virginia, have invented new and useful Improvements in Hobby-Horses, of which the following is a specification.

The present invention aims in the provision of a tricycle so designed as to afford the simulation of a hobby horse, and of such construction whereby upon the propelling action of the tricycle, motion will be imparted to the hobby horse in such a manner that the horse will be operated in a loping or level motion.

A further object of the invention is the production of a device of the above stated character which shall be simple in construction, durable in use and well adapted for the purposes intended.

With the above and other objects in view, the invention consists in the novel features, details of construction and combination of parts which will hereinafter be more fully set forth, illustrated in the accompanying drawings and pointed out in the appended claims.

Figure 1:
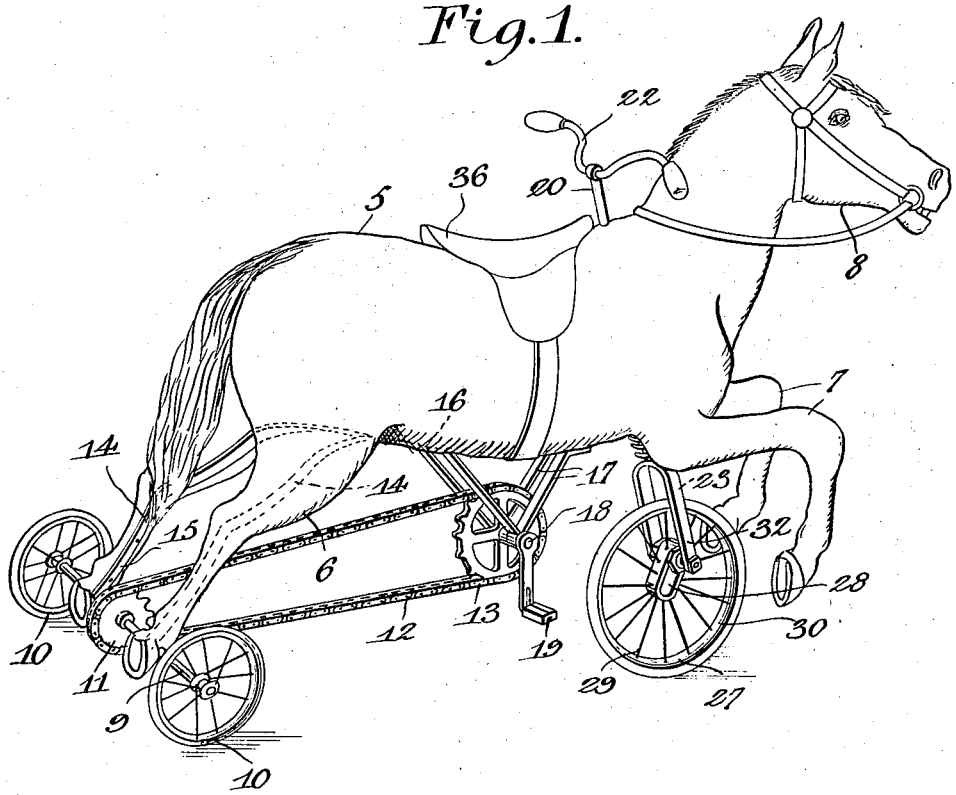
Figure 1 is a perspective view of the device constructed in accordance with my invention.
Figure 3:
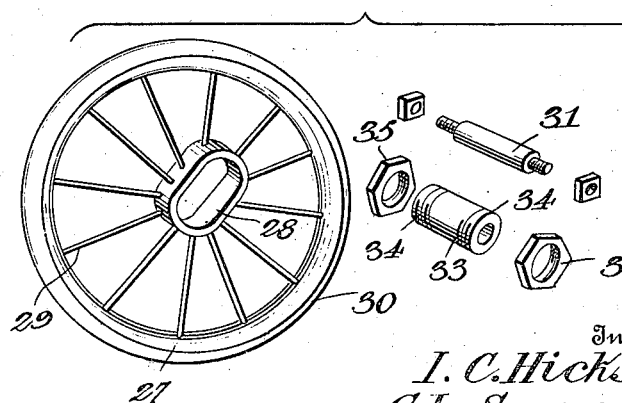
Fig. 3 is a detail perspective of the steering wheel illustrating the manner of connecting the forked end of a steering rod therewith.
Figure 2:
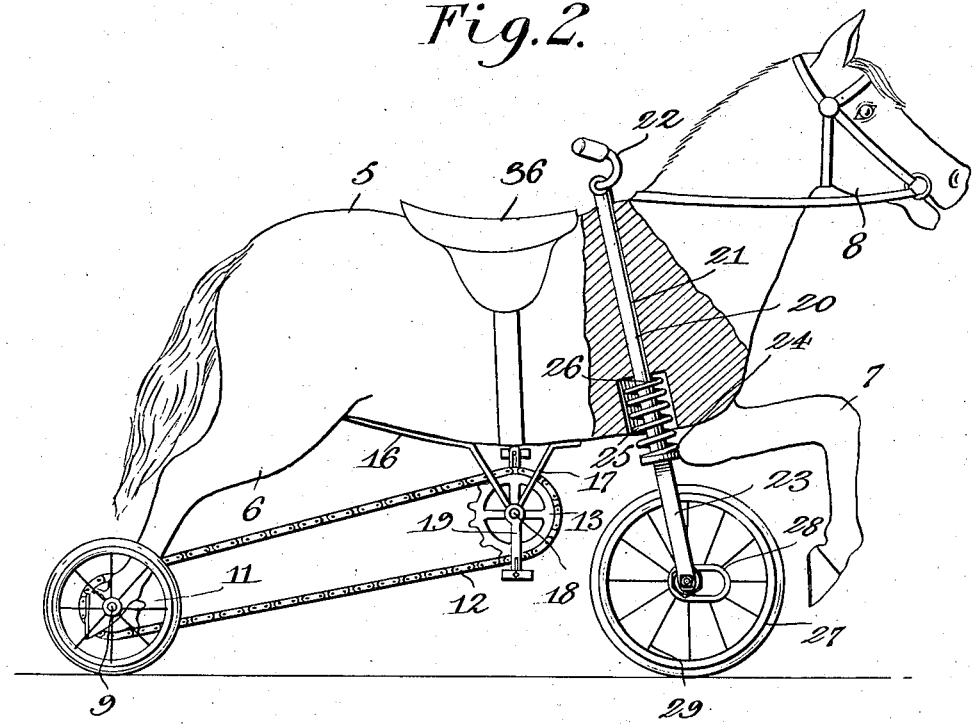
Fig. 2 is a side elevation of the device with the horse partly shown in section, clearly illustrating the manner of connection of the brace rods thereto and the manner of mounting the crank within the hanger.
Figure 4:
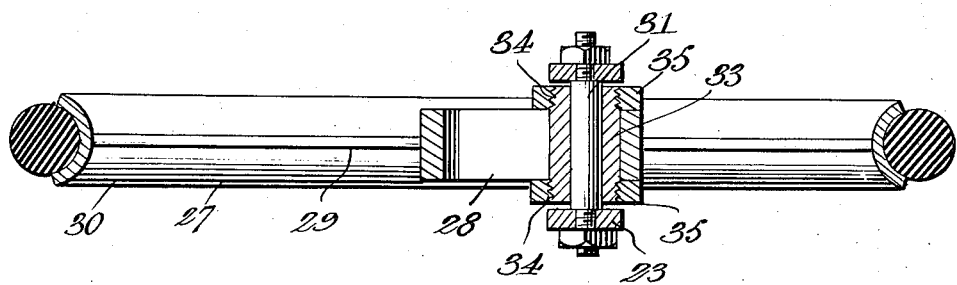
Fig. 4 is a similar view to Fig. 3, showing the connection of the forked end of the steering rod in adjusted position.

With reference to the accompanying drawing, 5 denotes the body portion of the tricycle, which in this particular instance simulates a horse provided with rear legs 6, front legs 7 and a head 8. The lower portion of the rear legs 6 of the horse serve as bearings for the shaft 9 to which rear wheels 10 are connected. Mounted upon the shaft 9 at a point substantially intermediate the length thereof and between the pair of rear legs 6 on the horse is a gear wheel 11, and motion is imparted to such gear wheel through the medium of an endless chain 12 trained over the sprocket wheel 13. The character 14 denotes a pair of reinforcing strips connected at their lower terminals to the lower extremities 15 of the rear legs 6 of the horse and are extended along the inner portions of said legs, thence longitudinally of the horse and beneath the same, as at 16, and the forward extremity of the portion 16 of the strip is bent to provide a depending V-shaped hanger 17. The sprocket wheel 13 has its shaft 18 journaled in the lower end of the V-shaped hanger 17, and mounted on the opposite terminals of the said shaft 18 are adjustable pedals 19, whereby motion may be transmitted to the sprocket wheel 13 and thence to the rear wheels 10 of the device, in the usual well known manner. The steering post 20 extends through the bore 21 formed through the vertical front portion of the horse or body 5 for opposite rotary movement, and is provided at its upper end with the usual handle bars 22, while the protruding lower end of the steering post 20 is formed with a forked end 23. The forked end 23, at the point of formation of the same with the lower end of the steering post 20 is provided with a circular disk 24 with which one end of a coiled spring 25 contacts, while the opposite end of said spring abuts with the shoulder 26 formed by enlarging the lower end of the bore 21, thus serving to accommodate the seating of a spring therein. It will, of course, be understood to those skilled in the art to which this invention relates that the sole object of this spring is to serve as a shock absorber for the device. Carried by and journaled in the lower end of the fork-shaped end 23 of the post 20, is a forward steering wheel 27 having an elongated bearing 28 from which the spokes 29 radiate and have connection with the felly or rim 30 of said wheel. It is my object in providing this specific form of bearing for the steering wheel to adjustably connect the same in the forked end 23 whereby upon connecting the forked end concentrically of such wheel will impart to the body portion of the hobby horse 5 of the device an even or level motion, and when the lower portion of the forked end 23 is adjusted in the elongated bearing 28 to connect the forked end eccentrically to such wheel a loping motion will be imparted to the horse. To this end, I provide a shaft 31 journaled in the lower extremities 32 of the forked end 23, and said shaft 31 passes through the elongated bearing 28 of the steering wheel and is adapted for adjustment. Surrounding the shaft and interposed between the limbs of the fork-shaped end 23, is a sleeve 33 having threaded on the extensions 34 thereof locking nuts 35. It will, therefore, be apparent that the tightening of the lock nuts 35 upon the sleeve 33 will bind the same against the opposite side faces of the bearings 28 and lock the shaft 31 either concentrically or eccentrically with the steering wheel 27 for the purposes above set forth. A saddle 36 is provided upon which the operator is seated when desiring to operate the tricycle.

From the foregoing description, taken in connection with the accompanying drawings, the advantages of construction and of the method of operation will be readily apparent to those skilled in the art to which this invention relates, and while I have described the principles of operation of the invention, together with the device which I now consider to be the best embodiment thereof, I desire to have it understood that the device shown is merely illustrative, and that such changes may be made when desired as are within the scope of the claims appended hereto.

What is claimed is:

1. A tricycle of the character set forth comprising a body portion, means for propelling the tricycle, a steering wheel having an elongated bearing, and steering mechanism connected in the elongated bearing of the steering wheel and adapted for adjustment at a point concentrically and eccentrically with the steering wheel.

2. A tricycle of the character set forth comprising a body portion, means for transmitting movement to said body, a steering post extending through the forward end of said body and terminating in a fork-shaped end, a steering wheel having an elongated bearing, a shaft connecting the limbs of the fork-shaped end together and extending through the elongated opening, and means for connecting said shaft in said opening at a point concentrically and eccentrically with the steering wheel.

3. A tricycle of the character set forth comprising a body portion, means for transmitting movement to said body, a steering post extending through the forward end of said body and terminating in a fork-shaped end, a steering wheel having an elongated bearing, a shaft connecting the limbs of the fork-shaped end together and extending through the elongated opening, a sleeve embracing said shaft and adapted for sliding adjustment within the elongated bearing of the steering wheel, and means threadedly mounted on the opposite extremities of the sleeve for locking the shaft at points concentrically and eccentrically with the steering wheel.

In testimony whereof we affix our signatures.

IRA CLAY HICKS.
GEORGE L. SUMMERS.